April 7, 1942. W. J. LAUFERSWEILER ET AL 2,278,706
DEVICE TO MOTIVATE A ROLLER CARRIAGE ON AN OVERHEAD TRACK
Filed Aug. 25, 1939 7 Sheets-Sheet 1

INVENTORS
WILLIAM J. LAUFERSWEILER
ROYAL E. THOMPSON
BY
ATTORNEYS

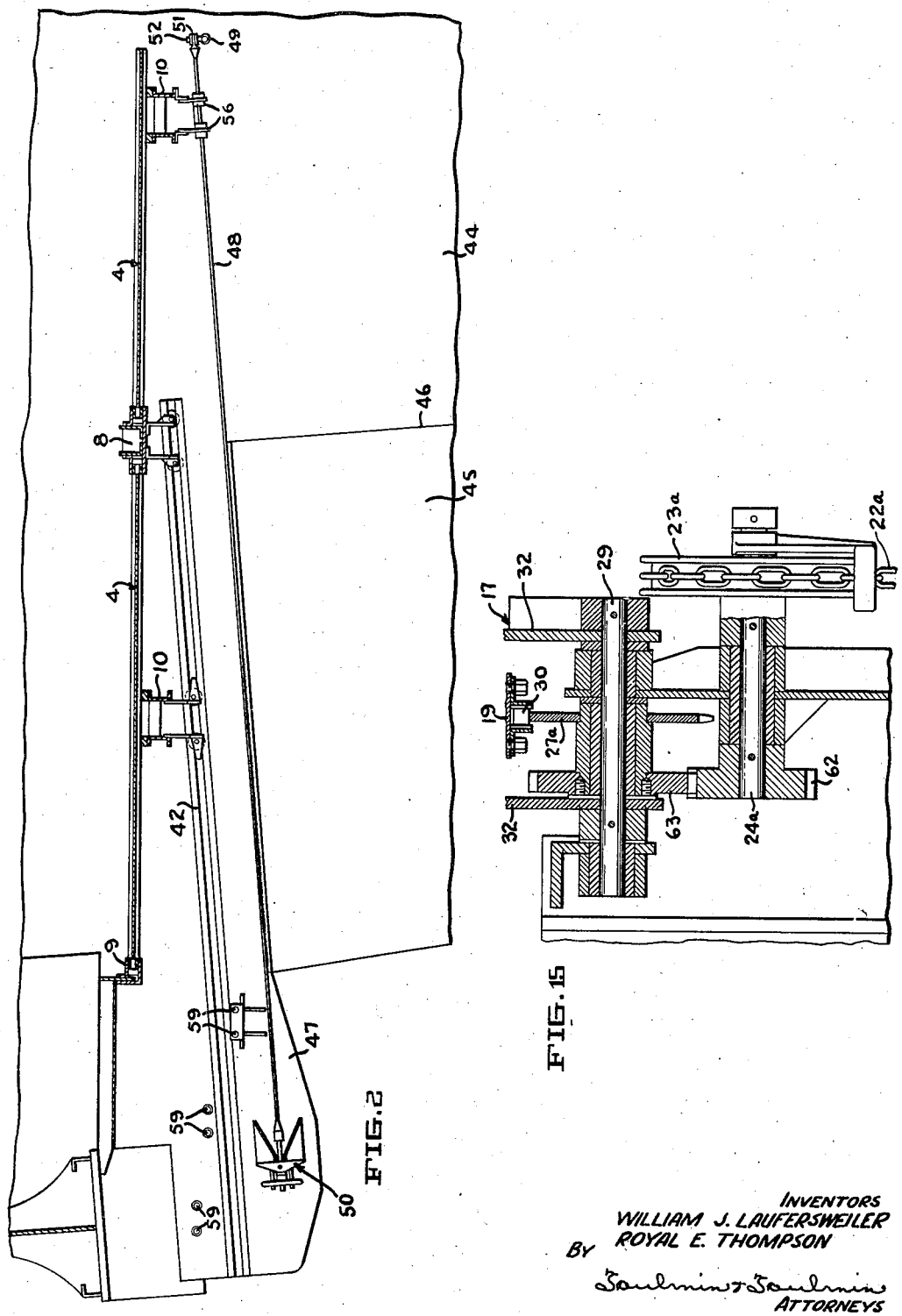

April 7, 1942. W. J. LAUFERSWEILER ET AL 2,278,706
DEVICE TO MOTIVATE A ROLLER CARRIAGE ON AN OVERHEAD TRACK
Filed Aug. 25, 1939 7 Sheets-Sheet 3
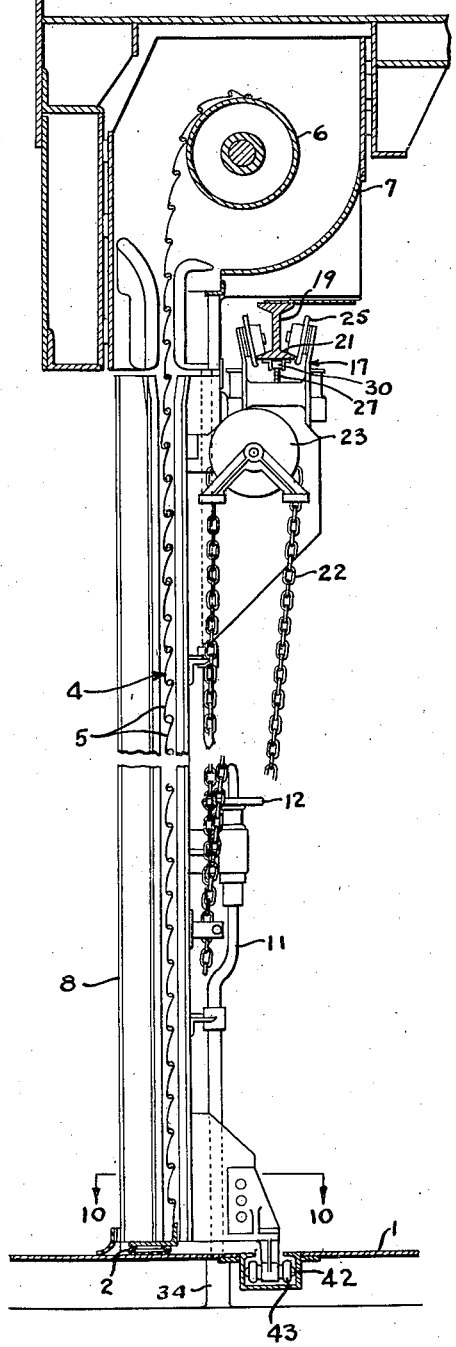
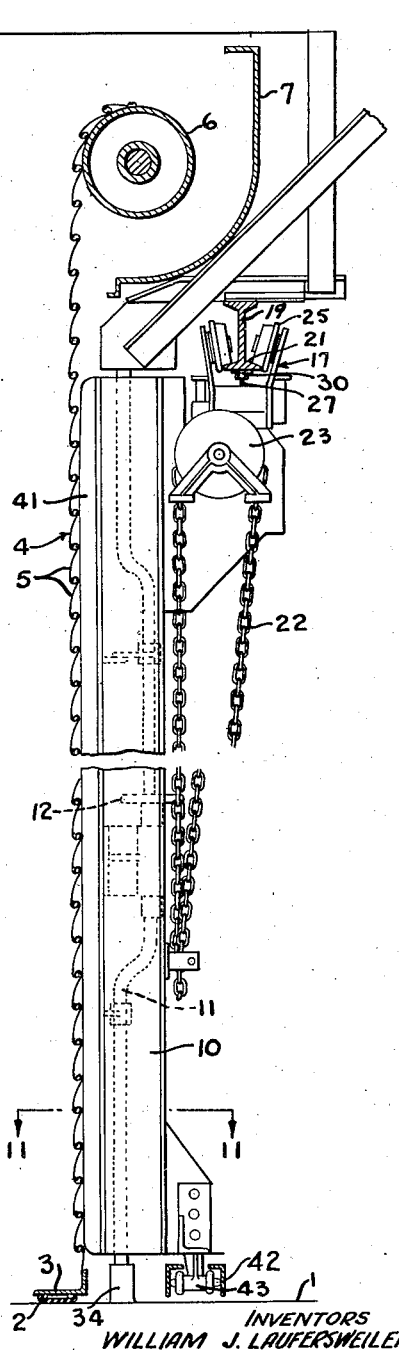
INVENTORS
WILLIAM J. LAUFERSWEILER
ROYAL E. THOMPSON
BY
Toulmin & Toulmin
ATTORNEYS

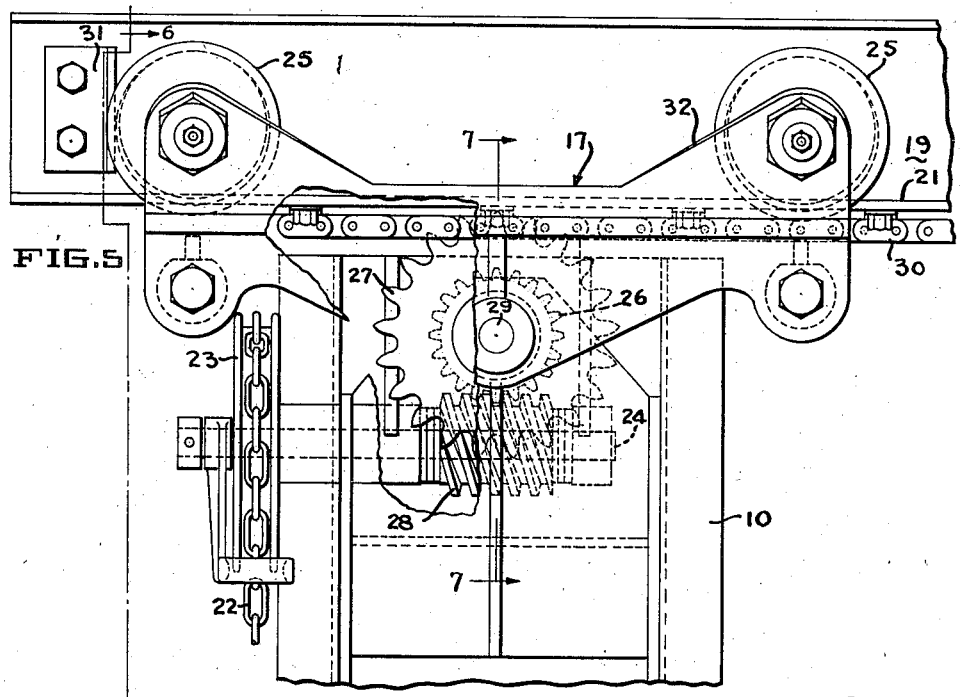
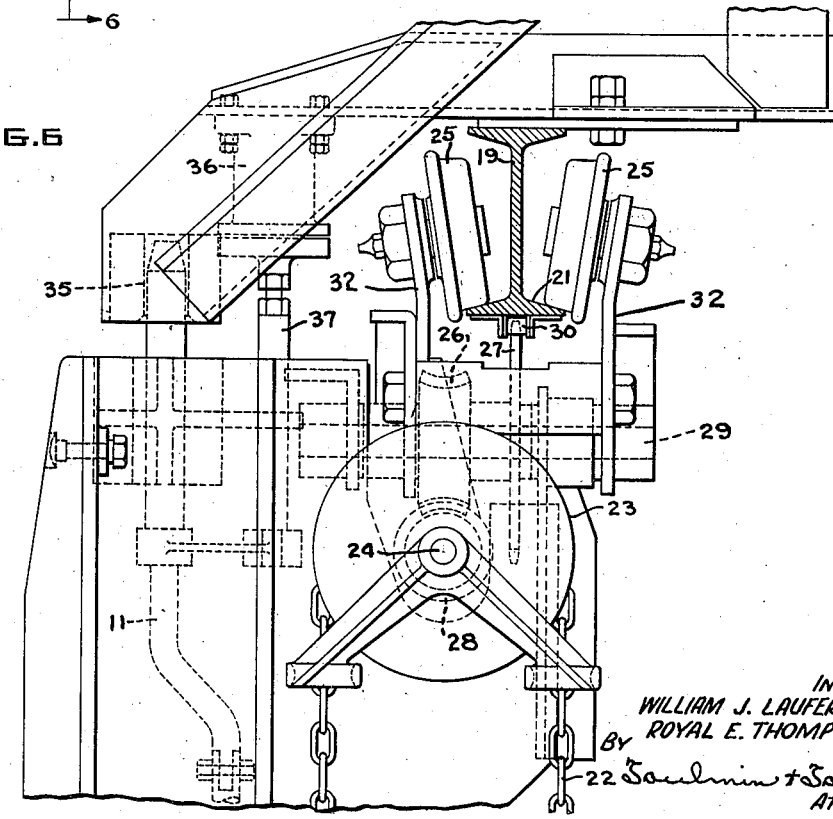

April 7, 1942.  W. J. LAUFERSWEILER ET AL  2,278,706
DEVICE TO MOTIVATE A ROLLER CARRIAGE ON AN OVERHEAD TRACK
Filed Aug. 25, 1939  7 Sheets-Sheet 5
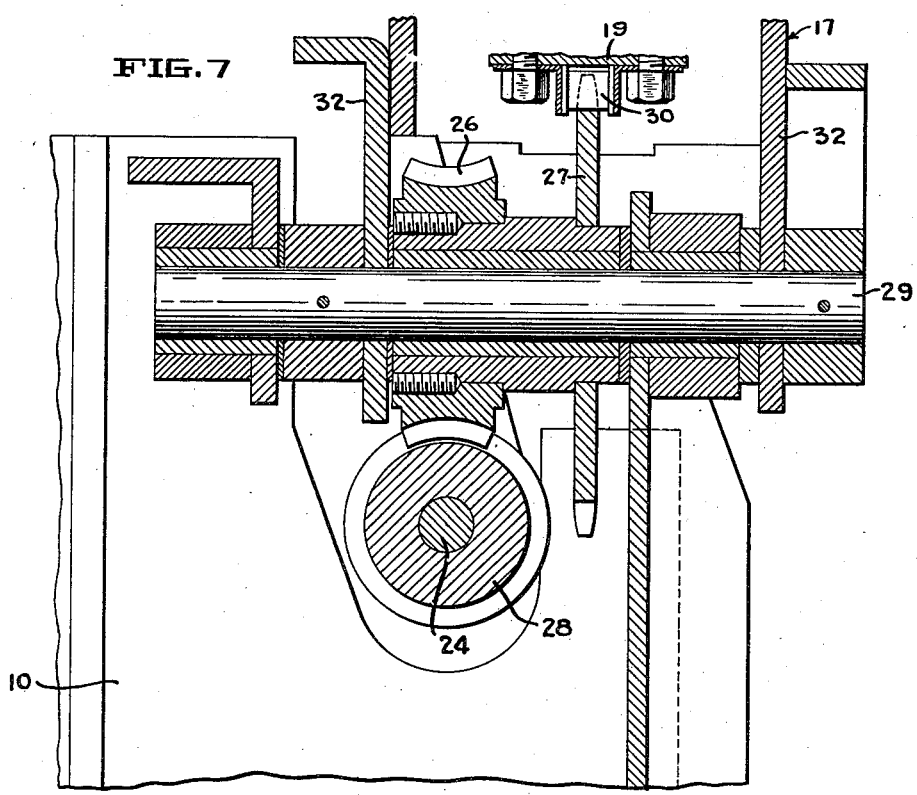
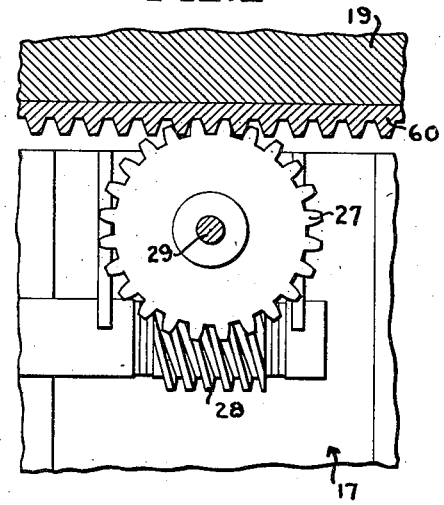
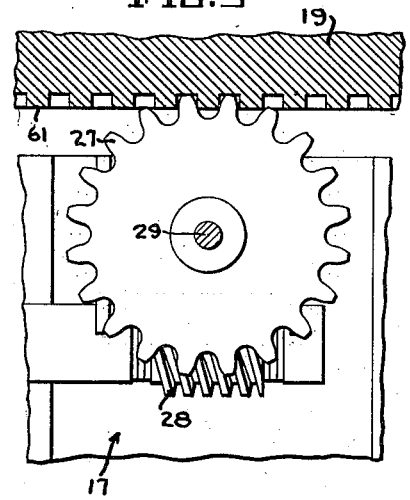
INVENTORS
WILLIAM J. LAUFERSWEILER
ROYAL E. THOMPSON
BY
Toulmin & Toulmin
ATTORNEYS

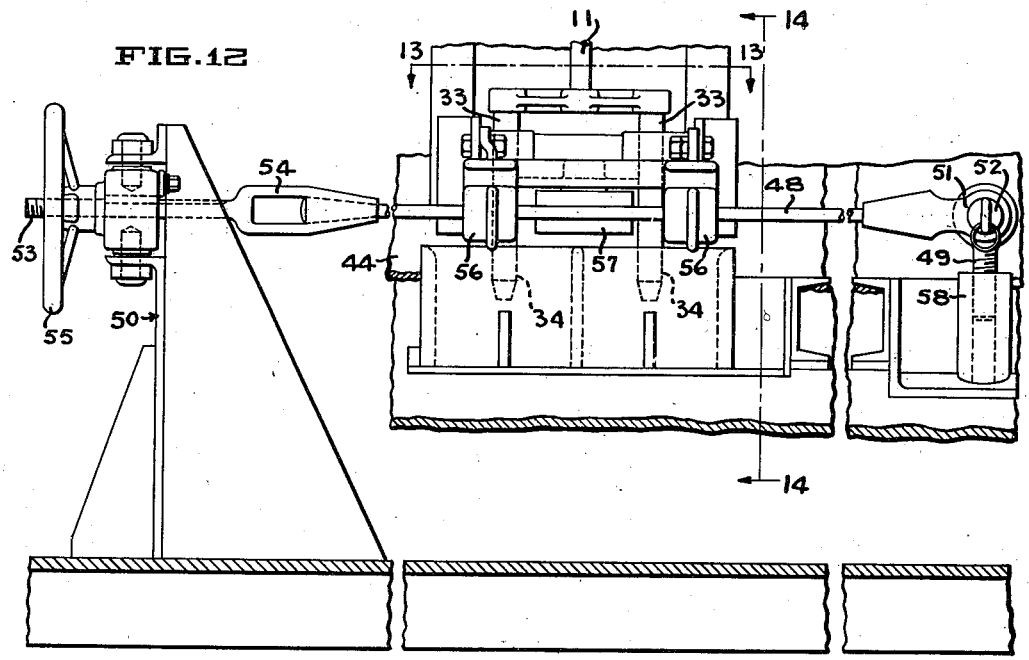
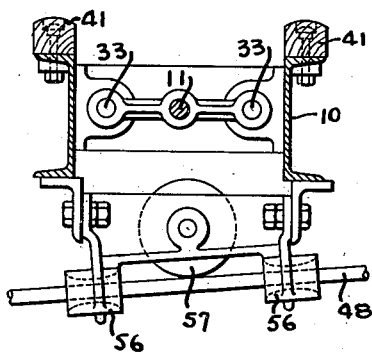
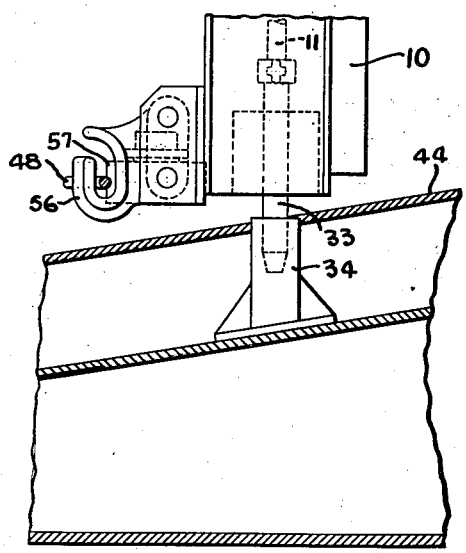

Patented Apr. 7, 1942

2,278,706

UNITED STATES PATENT OFFICE 2,278,706

DEVICE TO MOTIVATE ROLLER CARRIAGES ON OVERHEAD TRACKS

William J. Laufersweiler and Royal E. Thompson, Columbus, Ohio, assignors to The Kinnear Manufacturing Company, Columbus, Ohio, a corporation of Ohio Application August 25, 1939, Serial No. 291,944

2 Claims. (Cl. 189—46)

This invention relates to means for moving a roller carriage on an overhead track, and more particularly to means for motivating such a carriage which carries a movable post which is employed in conjunction with a door of the type which is adapted to be raised overhead.

Still more particularly, the invention relates to such a device and door employed on an aircraft carrier for closing the opening through which the airplanes are moved into and out of their storage hangar.

The principal object of the present invention is to devise improved means for moving the posts used in conjunction with an overhead door for guiding the same during its opening and closing and for reinforcing the same against the action of wind and the like; these posts are respectively known as pilasters and mullions; the invention provides means for moving these pilasters and mullions, which frequently weigh as much as a ton, without the possibility of injury to the operator in the case of a lurch of the ship or the like.

Another object of the invention is to provide improved means adjacent the bottom of the door for guiding a pilaster or mullion over an obstruction or elevated portion of the floor, whereby the necessity for the use of a track in the floor is eliminated; in a preferred form this means takes the form of a cable which is readily removable from the door opening after the pilasters and mullions have all been moved to the sides of the opening.

Other objects will more fully hereinafter appear.

In the accompanying drawings:

Figure 2 is a horizontal section of a modified form wherein the mullion for the central section of the door is adapted to be guided by a cable instead of by a deck track in its movement to the side of the door opening.

Figure 3 is a vertical section taken through the door to the left of a pilaster looking towards the pilaster.

Figure 4 is a vertical section taken to the left of a mullion looking towards the mullion; in this figure a modified form of deck track is shown.

Figure 5 is a rear elevation, partially in section, of one form of mullion or pilaster carrier.

Figure 6 is a vertical section on the line 6—6 of Figure 5 looking in the direction of the arrows.

Figure 7 is a vertical section on the line 7—7 of Figure 5 looking in the direction of the arrows.

Figures 8 and 9 are sectional views of modified forms of carrier propelling means.

Figure 12 is an enlarged elevational view showing details of the cable guiding means for guiding the mullion in its movement to the side of the door opening.

Figure 13 is a section on the line 13—13 of Figure 12 looking in the direction of the arrows.

Figure 14 is a section taken on the line 14—14 of Figure 12 looking in the direction of the arrows.

Figure 15 is a vertical sectional view showing an alternative form of construction for moving the pilaster or mullion.

Figure 1:
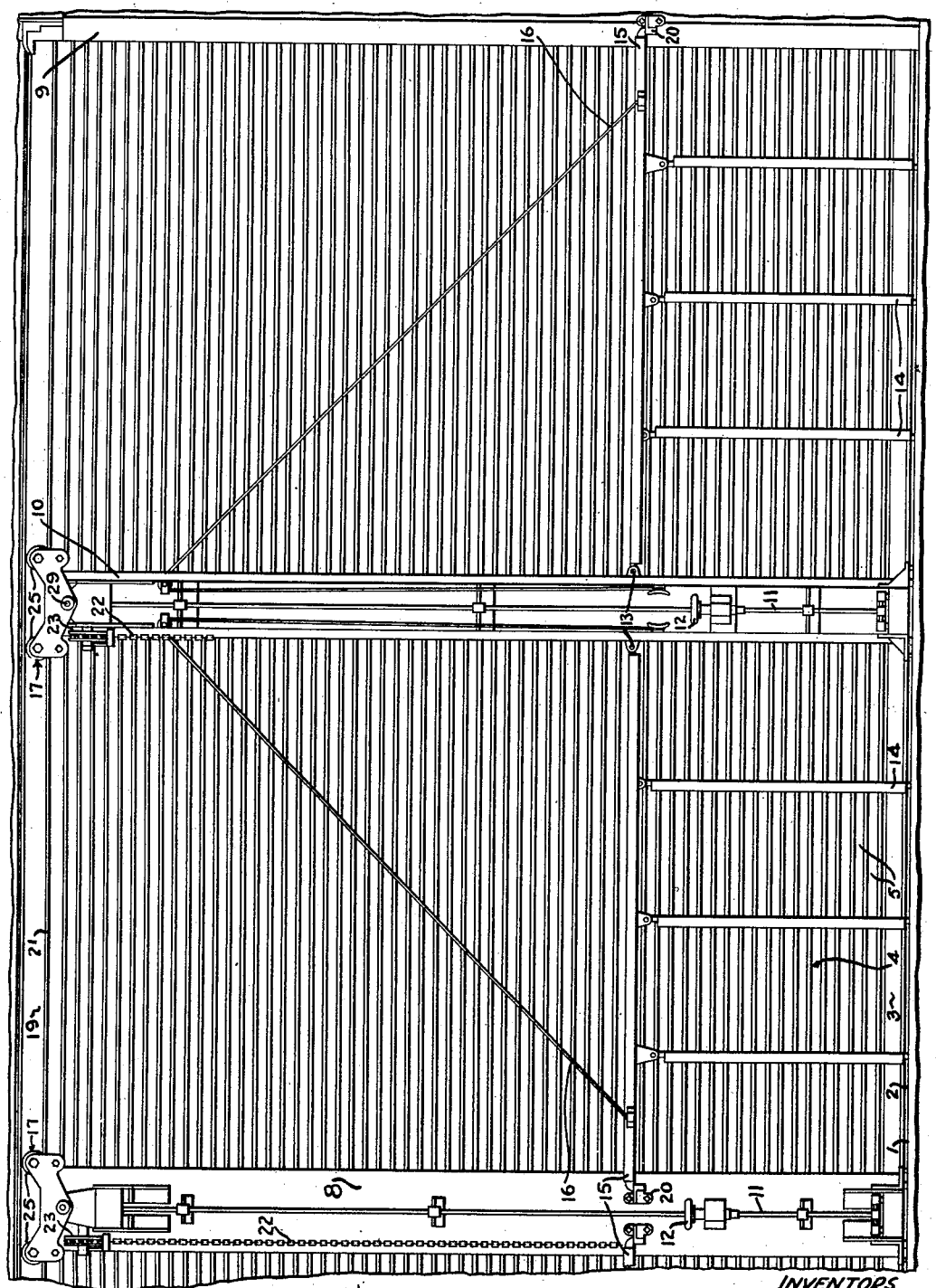
Figure 1 is an elevation of a door embodying the principles of the present invention; this view is taken from within the hangar.

Referring to the drawings in detail, and first particularly to Figure 1, the opening of the hangar is adapted to be closed by three flexible rolling steel curtains 4 which are made up of interengaging slats 5 and are adapted to be rolled upwardly about a drum 6 contained within a drum housing designated generally as 7 (see Figure 4) to thereby open the door. The bottom bar of the door, designated as 3, is provided with a rubber seal 2 adapted to engage the deck 1 of the ship. A movable pilaster 8 is provided at the intersection of adjoining curtains and serves to guide the curtains in their vertical movement and to support them against movement inwardly or outwardly. At the sides of the door opening a stationary pilaster 9 is provided. Intermediate the pilasters there is provided a movable post known as a mullion and designated by reference numeral 10. Mullion 10 serves to guide the door in its vertical movement and to reinforce it against inward pressure of water or wind, the door or curtain being disposed outwardly of mullions 10, as will appear from Figure 2. Mullions 10 and movable pilasters 8 are adapted to be locked into position by locking rods 11 which are adapted to engage sockets 35 and 34 respectively in the superstructure and in the deck, and to be locked or unlocked by a hand wheel 12. In this way, the mullions and pilasters can be unlocked in order to move them out of the door opening. As will be apparent, the curtains 4 will be raised before the locking means 11 is unlocked, the pilasters and mullions being subsequently moved out of the way.

In order to reinforce the lower portion of the door 4 against water, a water bracing is provided. This bracing is made up of horizontal members 15 to which are pivotally dependent vertical braces 14 which extend down to a point adjacent the bottom of the door. Members 15 are pivoted at 13 with respect to mullions 10 and the opposite end is adapted to be received behind a locking member 20 on pilasters 8 and 9. Lines 16 are provided for raising and lowering the water bracing, as will be apparent from Figure 1.

Mullions 10 and movable pilasters 8 are supported from an I-beam track 19 by means of a trolley, or carrier, designated generally as 17. Trolleys 17 pivotally support the heavy mullion or pilaster as by means of a pivot shaft 29 or in any other suitable manner. The trolley wheels 25 are adapted to ride upon the upper surface of the lower web 21. In order to motivate the trolley 17 along the track 19 an endless hand chain 22 is provided which extends downwardly to a point where it can be readily operated by hand from the deck. Chain 22 encircles a wheel 23 which is fixedly attached to a shaft 24 extending parallel to track 19. Fixedly mounted on shaft 24 is a worm 28 which engages a worm wheel 26 journaled about shaft 29, which extends at right angles to track 19 and is journaled in the sides 32 of trolley 17. Fixedly connected to worm wheel 26 is a toothed wheel 27 which engages a chain 30 mounted fixedly along the lower face of the I-beam track 19 and parallel thereto. Thus, as chain 22 is moved in the desired direction, trolley 17 will be propelled along track 19. The central mullion 10 may be provided with a stop 31 adapted to cause it to stop in the desired position as it is returned to the middle of the door. This stop 31 may be fixedly mounted on channel beam 19.

As a result of the propelling construction just described, the heavy pilasters and mullions may be moved with absolute safety to the operator since should a lurch of the ship cause the operator to lose his hold on the hand chain 22, the locking action of the irreversible worm 28 and worm wheel 27 will cause the pilaster or mullion to stop instantly. In the past, these mullions and pilasters, which are very heavy, have caused injury to personnel and equipment by getting out of control after the locking means, corresponding to 11, was unlocked.

The load is pivoted on the trolley 17 so as to allow it to swing parallel to the plane of the overhead track 19 without lifting an end of the carriage upwardly off the track 19 or causing toothed wheel 27 to jam or bind in its rack formed by chain 30.

Track 19 is made up of two portions, each of which extends from a point adjacent the side of the door opening to the center of the door opening, the track being outwardly inclined at a slight angle relative to the curtains 4, as will be apparent from the drawings. This angle is such that the trolleys employed in the usual construction will all engage a common track. However, in the construction of Figure 2 it is not possible to use a common track for all trolleys, it being necessary to use a single separately disposed track for the central mullion 10.

The lower locking rod 11 is bifurcated at its lower end into vertical portions 33 which are adapted to be received within sockets 34 provided in the deck or extending up from the deck (see Figures 3 and 4). The upper locking rod 11 is adapted to be received within a socket 35 provided in the superstructure. Means is provided for preventing operation of the curtain raising and lowering mechanism except when these locking rods are in their locked position, so that all of the pilasters and mullions must be in place and locked before the curtains 4 can be raised or lowered. This means comprises an interlock switch 36 (see Figure 6) which is closed by the upward movement of a member 37 which is fixedly attached to the upper locking rod 11. Thus, whenever the locking rods 11 are in their unlocked position, interlock switch 36 is open and consequently the circuit through the door operating motor is broken so that it is impossible to operate the door except when all of the pilasters and mullions are locked in their proper positions.

Figure 10:
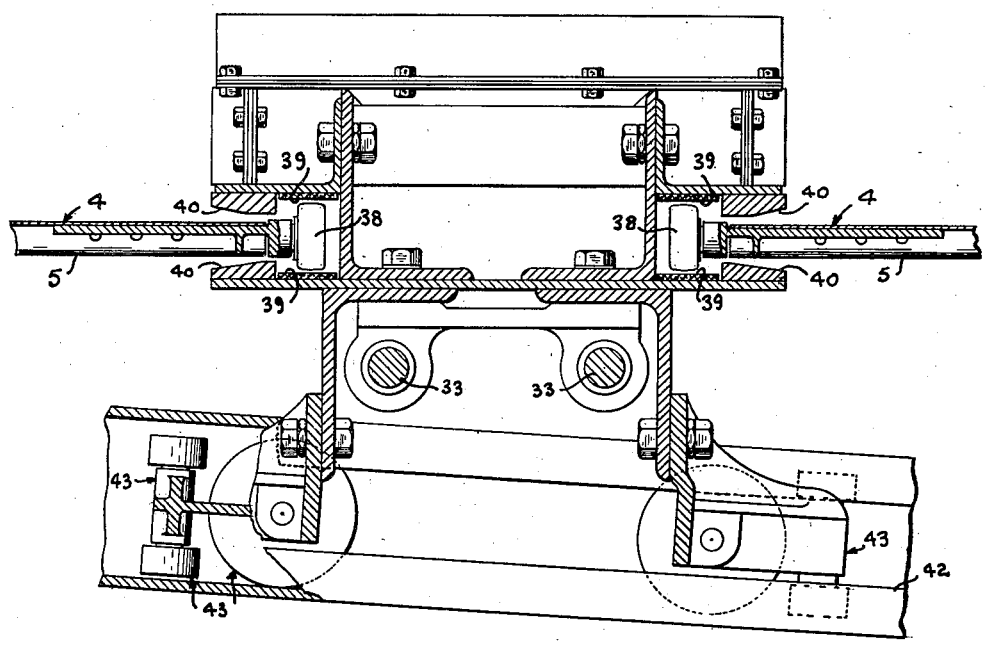
Figure 10 is a section on the line 10—10 of Figure 3 looking in the direction of the arrows.

The ends of the curtain 4 are received and guided by the intermediate movable pilasters 8 (see Figure 10). These ends of the curtain are received within guide slots on either side of pilaster 8. Rollers 38 carried on the ends of the slats of the curtain are adapted to ride upon sections of brake lining 39, which act as sound deadeners. Tapered vertical members 40 are provided to prevent the withdrawal of the curtain from its guides under wind pressure also to prevent passage of light or wind around the ends of curtains 4.

The mullions 10 are provided on their forward faces with wood strips 41 (Figure 11) which are adapted to engage the curtain with a minimum of friction.

Figure 11:
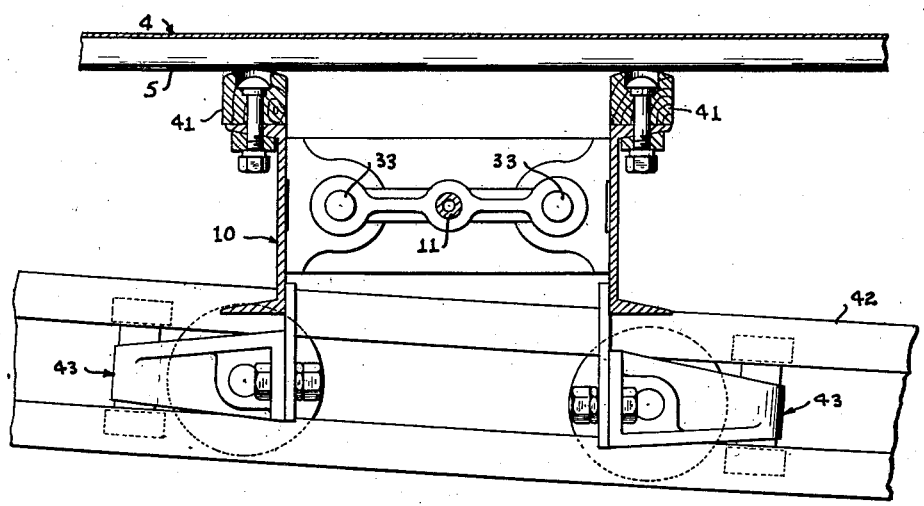
Figure 11 is a section on the line 11—11 of Figure 4 looking in the direction of the arrows.

For guiding the lower end of the pilasters 8 or the mullions 10 in their movement to the side of the door opening, a number of different methods may be employed. A deck track 42 is shown in Figures 10 and 11. This deck track 42 may be mounted either above the deck as in Figure 4 where its presence in such position would not be objectionable or would be mounted below the deck as in Figure 3. Casters designated generally as 43 are provided at the bottoms of the mullions 10 and pilasters 8 for engagement with deck track 42. The deck track 42 will be inclined at an angle relative to the door (see Figures 2, 10 and 11) and parallel to the trolley track or tracks 19 which will be located exactly thereabove. A single overhead track 19 and a single deck track 42 may be provided or the central mullion 10 may have its own overhead track 19 and deck track 42 leading from the center to one side of the door opening. In such case, a separate deck track 42 and overhead track 19 will be provided for the first mullion 10 and for the first pilaster 8 at each side of the door opening. In Figures 2 and 12 to 14 there is illustrated an alternative form of construction wherein the hangar has an upwardly inclined runway 44 in its center, and has a slanting deck surface 45 at either side of the runway 44, the sections 45 and 44, merging at the joint line 46. Surface 45 slants downwardly from the edge of the runway 44 towards the sides of the hangar where it merges with a horizontal surface 47. The central mullion 10 is thus unable to be guided by a deck track because its lower end is elevated above the lower ends of the first mullion 10 and the first pilaster 8. Accordingly, a flexible stayline 48 is provided for guiding the central mullion 10, this line 48 being stretched tautly parallel to deck track 42 between a pin 49 located adjacent the center of the door opening and a vertical assembly 50 located at the side of the door opening. This stayline 48 has ears 51 at its outward end which are adapted to be slidably received over a forwardly extending pin 52 slidably mounted in the upper end of vertical pin 49. The other end of stayline 48 is provided with a member 54 extending through vertical assembly 50. An internally threaded hand wheel 55 is provided on the outward end of this member 54, whereby stayline 48 may be tautened. Mullion 10 is provided at its lower end with ears 56 adapted to slidably engage stayline 48 and guide mullion 10 in its movement. As indicated in Figure 14, a socket 34 is provided below the inclined surface 44 for the reception of locking pins 33. A roller 57 (see Figures 12 to 14) is provided for rollingly engaging stayline 48. Thus, central mullion 10 is adapted to be moved back and forth along stayline 48. After it has been moved to this position at the side of the door opening adjacent vertical assembly 50, hand wheel 55 may be rotated so as to loosen stayline 48 whereupon its inward end may be removed from attachment with vertical pin 49, by pulling slidable pin 52 out of ears 51. The stayline 48 may then be removed to a position at the side of the hangar. If desired, vertical pin 49 may thereafter be unscrewed out of its deck socket 58 (see Figure 12) although usually it will not be objectionable to leave pin 49 in position. Thereafter, when it is desired to move the mullion 10 into position, stayline 48 will be replaced and the mullion will be moved to the center of the door opening by the actuation of trolley 17 by means of hand chain 22.

For locking the pilasters and mullions at the side of the opening, sockets 59 (Figure 2) are provided in the deck and corresponding sockets (not shown) are provided in the superstructure. In this way, the mullions and pilasters may be locked by means of locking rods 11 at the sides of the door opening.

In Figures 8 and 9, alternative means for propelling the trolley 17 along the track are shown. In Figure 8, a rack 60 is fixedly mounted on the lower surface of track 19 and is adapted to be engaged by toothed wheel 27. In Figure 9, the track 19 itself is provided on its lower side with teeth 61 which are adapted to be enmeshed with the teeth of toothed wheel 27.

In Figure 15 there is illustrated a form of trolley drive which does not have the locking features of the trolley drive described above. In this embodiment, the pilaster 8 or mullion 10 is pivoted as before about shaft 29 which is fixedly pinned in the side plates 32 of trolley 17, as before. A hand chain 22a encircles a chain wheel 23a pinned to a shaft 24a on which is pinned a gear 62 which enmeshes with a gear 63 journaled rotatably about shaft 29. Fixedly attached to gear 63 is a toothed wheel 27a which is in mesh with a chain 30 mounted on track 19 as before. Thus, movement of hand chain 22a causes movement of the mullion or pinion suspended from trolley 17 along the track 19, but this movement is not irreversible as is the case with the trolley drive described above.

The operation of the mechanism of the present invention will be apparent from the foregoing but may be reiterated as follows. Assuming that the hangar door is in closed position, as indicated in Figure 1, the first step will be to raise the water bracing by means of lines 16. Next, the curtain operating mechanism will be operated to raise the curtains 4 upwardly into the drum housing 7 located above the mullions and pilasters. The locking rods 11 will now be manipulated so as to unlock the mullions and pilasters, whereupon the first mullions 10 will be moved to the side of the hangar and will be locked in that position. Then the movable pilasters 8 will be moved to their position at the side of the hangar. Following this, the center mullion 10 will be moved to its position at the side of the hangar, either on track 42 or along stayline 48. To close the door, the reverse procedure will take place, the operation of locking the mullions and pilasters in place, making it possible to effect operation of the door lowering mechanism, whereupon the doors will be lowered, after which the water bracing will be lowered into the position shown in Figure 1.

We wish it to be understood that we intend to include as within our invention such modifications as may be necessary to adapt it to varying conditions and uses and which fall within the scope of the appended claims. In this specification and the claims appended hereto, we use the term "irreversible" to mean that the post member can be moved by manual or other manipulation of the trolley motivating means but cannot be moved in any other manner. In other words, we refer to the fact that when hand chain 22 is moved, the trolley and post member are moved on the track but when hand chain 22 is not moved, it is impossible for an outside force applied to the trolley or post to move the same.

Having thus fully described our invention, what we claim as new and desire to secure by Letters Patent is:

1. In a door closing mechanism, a track, a trolley thereupon, a member depending therefrom which is to be moved, and means movable with said trolley and movable member for irreversibly propelling the same along said track, said last named means comprising a rotatable wheel, an endless hand chain passing therearound and adapted to rotate the same, a worm fixedly attached to said rotatable wheel, a worm wheel irreversibly enmeshed with said worm, a toothed wheel fixedly attached to said worm wheel, and means fixedly mounted parallel to said track adapted to be drivingly engaged by said toothed wheel, whereby movement of said hand chain causes propulsion of said trolley and said movable member along said track, but said trolley and said movable member are locked against movement along said track whenever movement of said hand chain is discontinued.

2. In combination, a track, a trolley thereupon, pivot means on said trolley disposed transversely of said track, a mullion supported from said trolley and pivoted around said pivot means so as to be swingable in a plane parallel to said track, rack means fixedly mounted parallel to said track, toothed means rotatably mounted on said trolley around said pivot means and in driving engagement with said rack means, and irreversible means for irreversibly rotating said toothed means but locked against accidental movement and thereby moving said trolley and load along said track.

WILLIAM J. LAUFERSWEILER.
ROYAL E. THOMPSON.